(12) United States Patent
Otomitsu

(10) Patent No.: US 11,422,315 B2
(45) Date of Patent: Aug. 23, 2022

(54) OPTICAL CONNECTOR SYSTEM

(71) Applicant: FUJIKURA LTD., Tokyo (JP)

(72) Inventor: Takahito Otomitsu, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 17/269,833

(22) PCT Filed: May 20, 2019

(86) PCT No.: PCT/JP2019/019943
§ 371 (c)(1),
(2) Date: Feb. 19, 2021

(87) PCT Pub. No.: WO2020/059209
PCT Pub. Date: Mar. 26, 2020

(65) Prior Publication Data
US 2021/0199895 A1    Jul. 1, 2021

(30) Foreign Application Priority Data
Sep. 18, 2018  (JP) .............................. JP2018-173410

(51) Int. Cl.
*G02B 6/38* (2006.01)
(52) U.S. Cl.
CPC ........... *G02B 6/387* (2013.01); *G02B 6/3831* (2013.01)
(58) Field of Classification Search
None
See application file for complete search history.

(56) References Cited

U.S. PATENT DOCUMENTS 6,364,536 B1    4/2002  Chen et al.
6,824,311 B2 *  11/2004  Chen .................... G02B 6/3897
                                                         385/78
(Continued)

FOREIGN PATENT DOCUMENTS

CA      2354174 A1    5/1991
CN    106602356 A     4/2017
(Continued)

OTHER PUBLICATIONS

Shin-ichi Iwano, et al., "MU-type Optical Fiber Connector System", Japan Telecommunication Review, Telecommunications Association, Tokyo, JP, vol. 9, No. 2, Mar. 1, 1997, pp. 63-71, XP000687069 (9 Pages).

(Continued)

*Primary Examiner* — Jerry Rahll
(74) *Attorney, Agent, or Firm* — Osha Bergman Watanabe & Burton LLP

(57) ABSTRACT

An optical connector system includes: a first optical connector including a first ferrule and a first housing that houses the first ferrule; and a second optical connector including a second ferrule that connects to the first ferrule, a second inner housing that houses the second ferrule, and a second outer housing that houses the second inner housing. The second optical connector detachably connects to the first optical connector. The first housing includes a latch receptacle and a latch releaser. The second inner housing includes a front latch that latches to the latch receptacle and a rear latch that latches to the second outer housing.

13 Claims, 8 Drawing Sheets

(56) References Cited

U.S. PATENT DOCUMENTS

| | | | |
|---|---|---|---|
| 2003/0156797 A1* | 8/2003 | Gherardini | G02B 6/3893 |
| | | | 385/59 |
| 2012/0039569 A1* | 2/2012 | Kevern | G02B 6/3897 |
| | | | 385/56 |
| 2012/0128302 A1 | 5/2012 | Katagiyama et al. | |
| 2015/0346438 A1 | 12/2015 | Kato | |

FOREIGN PATENT DOCUMENTS

| | | |
|---|---|---|
| CN | 110770981 A | 2/2020 |
| JP | H03172806 A | 7/1991 |
| JP | H08211250 A | 8/1996 |
| JP | H1039171 A | 2/1998 |
| JP | 2001318274 A | 11/2001 |
| JP | 2008046434 A | 2/2008 |
| JP | 2014112218 A | 6/2014 |
| JP | 2015227938 A | 12/2015 |

OTHER PUBLICATIONS

Naoko Shimoji, "MPO Optical Backplane Connector", IEICE Transaction on Communication, Communications Society, Tokyo, JP, vol. E80-B, No. 4, Apr. 1, 1997, pp. 535-539, XP000721827 (5 Pages).

* cited by examiner

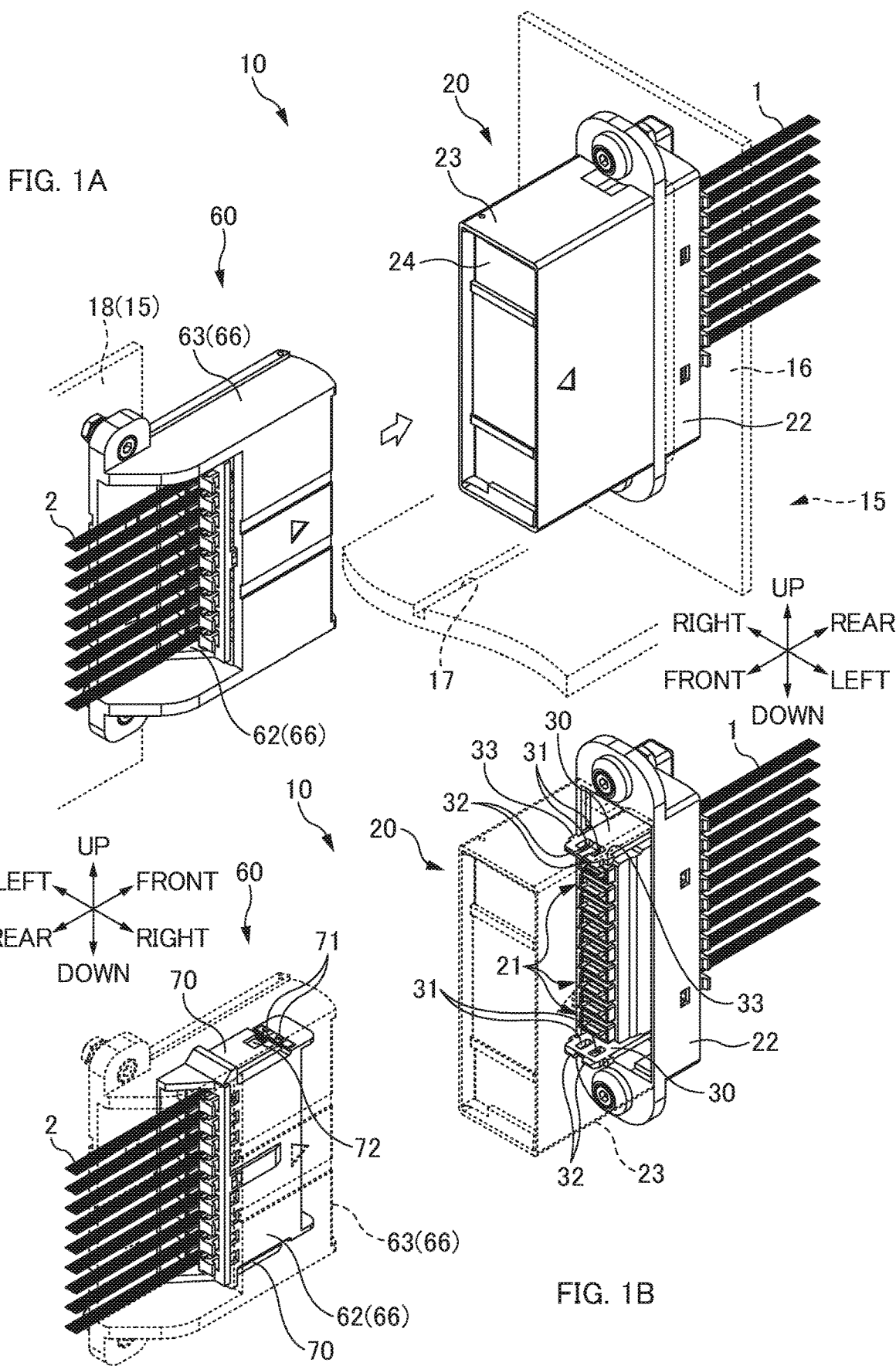

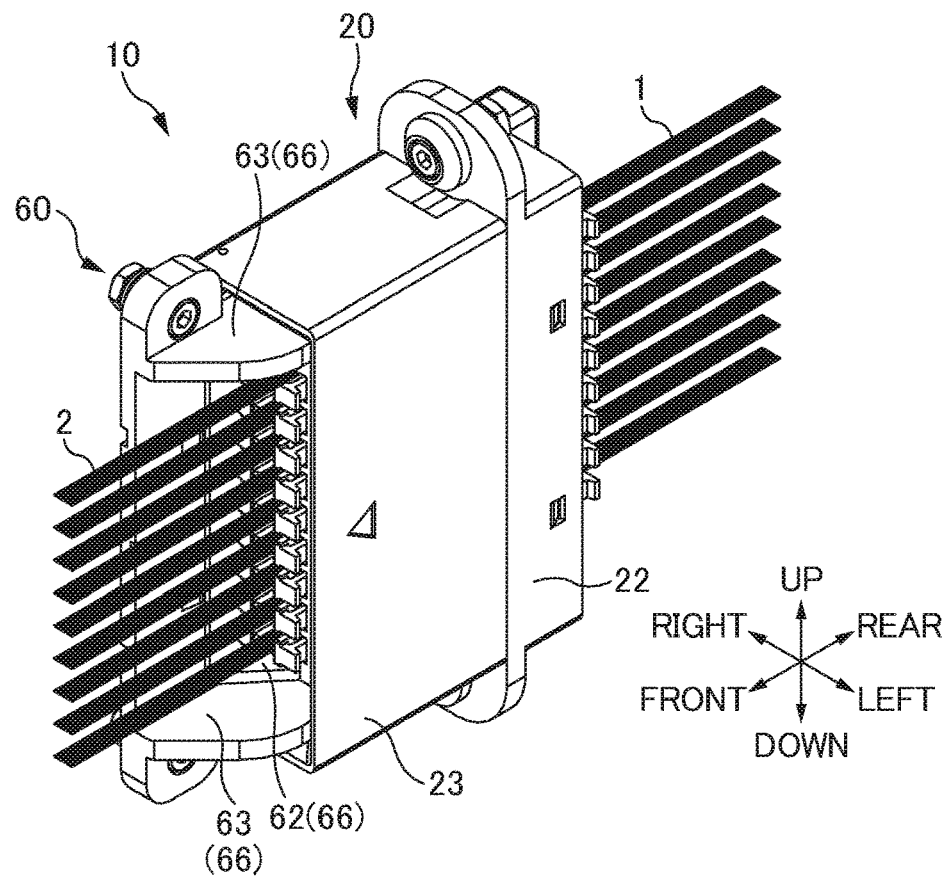
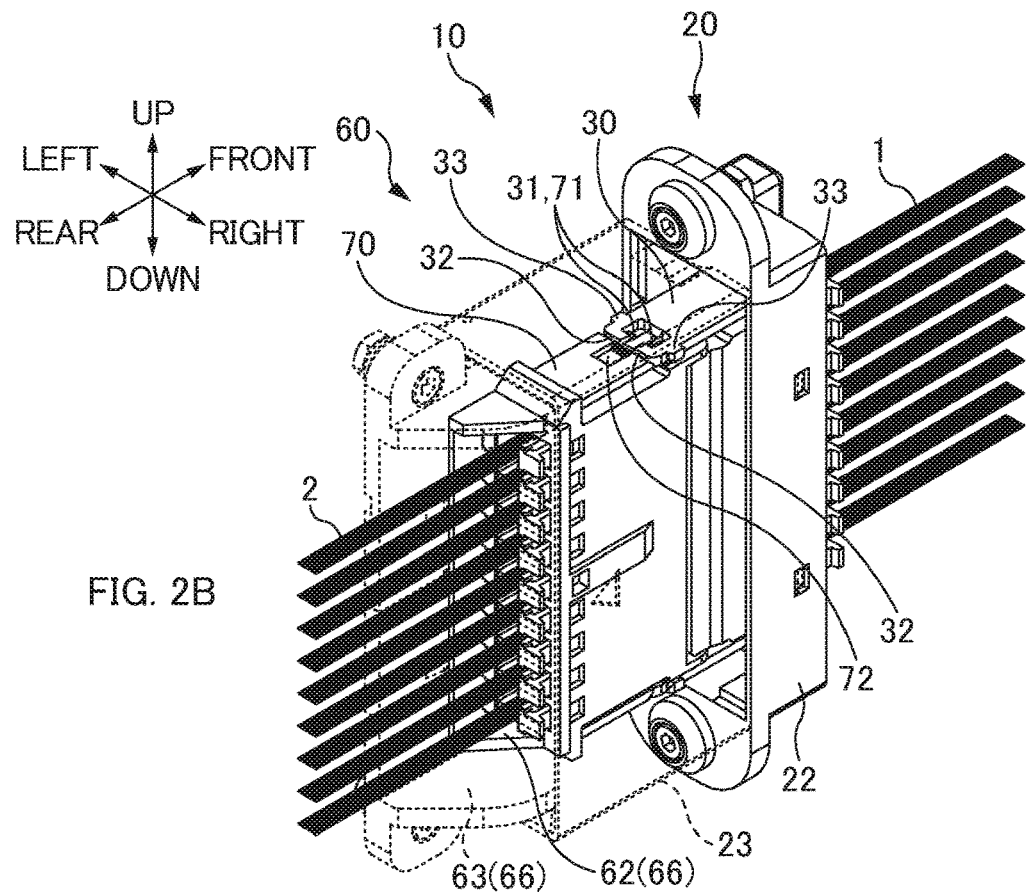

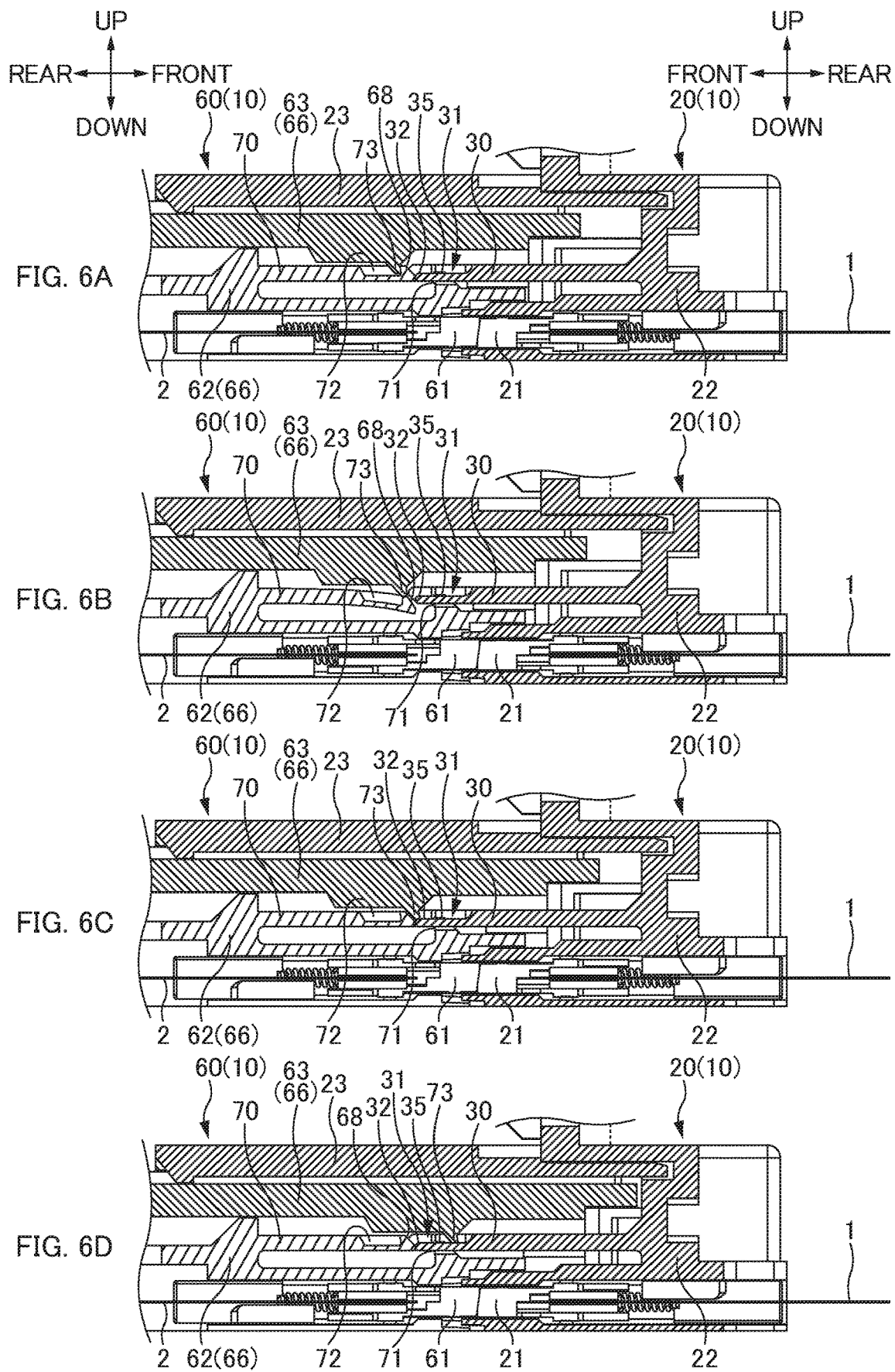

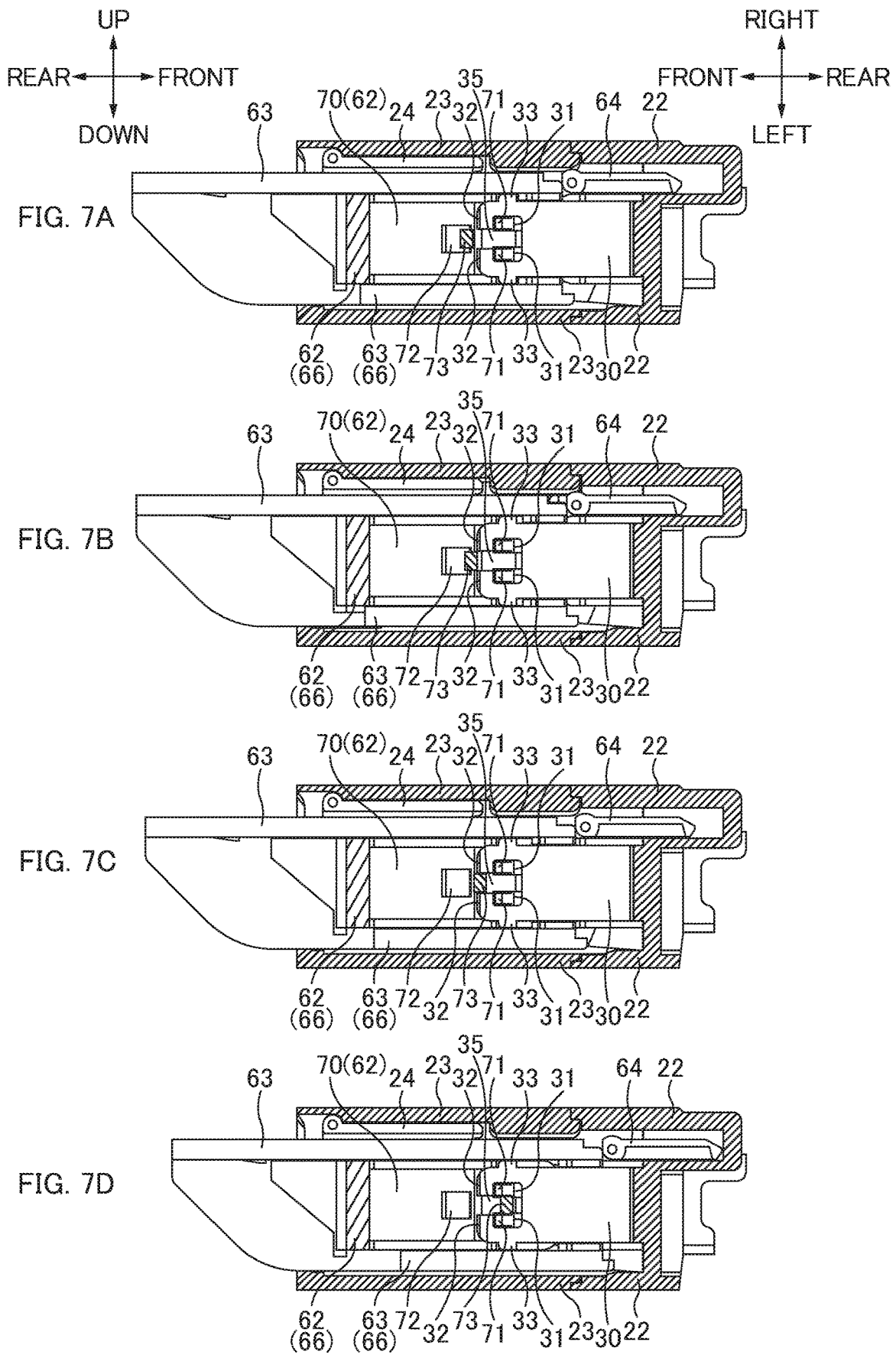

OPTICAL CONNECTOR SYSTEM

BACKGROUND

Technical Field

The present invention relates to an optical connector system.

Related Art

As an example of an optical connector that houses a ferrule in a housing so as to be retractable, for example, a mechanically transferable (MT) optical connector (F12-type optical connector defined by JIS C 5981) has been known. In an optical connector system constituted by such an optical connector, endfaces of ferrules that hold end parts of optical fibers by fitting of housings together abut each other, and the optical fibers are optically connected to each other.

As such an optical connector system, for example, Patent Literature 1 discloses an optical connector system in which fitting of housings together is performed in two stages. In a first stage of fitting, a housing (reception-side housing) of an optical connector on a reception side and a housing (movable-side housing) of an optical connector on a movable side fit together, and thus the housings have a predetermined positional relationship. In a second stage of fitting, a latch of a reception-side inner housing and a reception-side outer housing that constitute the reception-side housing is released, and thus the reception-side inner housing can move with respect to the reception-side outer housing. After the second stage of fitting, a "floating state" is achieved where the movable-side housing and the reception-side inner housing can move with respect to the reception-side outer housing while the movable-side housing and the reception-side inner housing remain in the predetermined positional relationship.

Patent Literature

Patent Literature 1: JP 2015-227938A

In the optical connector system disclosed in Patent Literature 1, in the first stage of fitting, a latch part (engaged piece 34d) of the movable-side housing (movable-side housing 31) and a latch part (engaging piece 24m) of the reception-side inner housing (inner housing 24) engage with each other, and thus the movable-side housing 31 and the inner housing 24 fit together. In the second stage of fitting, a latch release part (engagement release piece 33g) of the movable-side housing 31 displaces a latch part (elastic engagement piece 24d) of the inner housing 24 inward, and thus the inner housing 24 can move with respect to the reception-side outer housing (outer housing 23). Here, the latch part (engaged piece 34d) and the latch release part (engagement release piece 33g) are each provided on a different section of the movable-side housing 31. Thus, a restriction by an arrangement of the engaged piece 34d and the engagement release piece 33g makes it difficult to reduce the size of the optical connector system.

SUMMARY

One or more embodiments reduce the size of an optical connector system in which fitting of housings together is performed in two stages.

According to one or embodiments, an optical connector system includes:

a first optical connector including a first ferrule and a first housing that houses the first ferrule; and a second optical connector including a second ferrule to be connected to the first ferrule, a second inner housing that houses the second ferrule, and a second outer housing that houses the second inner housing, the second optical connector being attachable to and detachable from the first optical connector.

The first housing includes a latch reception part (i.e., latch receptacle) and a latch release part (i.e., latch releaser), and the latch reception part and the latch release part are provided on a first arm part extending toward the second optical connector along a direction (i.e., connection direction) of attaching and detaching of the first optical connector and the second optical connector.

The second inner housing includes a front latch part configured to be latched to the latch reception part and a rear latch part configured to be latched to the second outer housing, and the rear latch part is provided on a second arm part extending toward the first optical connector along the direction of attaching and detaching.

The rear latch part is latched to the second outer housing before the first optical connector and the second optical connector are connected to each other.

The latch release part releases a latch of the rear latch part by relatively moving the first optical connector and the second optical connector to a connection side, after the front latch part is latched to the latch reception part.

Other features of one or more of the present invention are made clear by the following description and the drawings.

According to one or more embodiments of the present invention, the size of an optical connector system in which fitting of housings together is performed in two stages can be reduced.

BRIEF DESCRIPTION OF THE DRAWINGS

FIGS. 1A and 1B are perspective views of an optical connector system 10 before connector connection.

FIGS. 2A and 2B are perspective views of the optical connector system 10 after the connector connection.

FIGS. 6A to 6D are cross-sectional views of when the optical connector system 10 in a second stage of fitting is cut in the plane vertical to the left-right direction.

FIGS. 7A to 7D are cross-sectional views when the optical connector system 10 in the second stage of fitting is cut in a plane vertical to an up-down direction.

DETAILED DESCRIPTION

At least the following matters are made clear from the following description and the drawings.

An optical connector system is made clear, comprising: a first optical connector including a first ferrule and a first housing that houses the first ferrule; and a second optical connector including a second ferrule to be connected to the first ferrule, a second inner housing that houses the second ferrule, and a second outer housing that houses the second inner housing, the second optical connector being attachable to and detachable from the first optical connector, wherein the first housing includes a latch reception part and a latch release part, and the latch reception part and the latch release part are provided on a first arm part extending toward the second optical connector along a direction of attaching and detaching of the first optical connector and the second optical connector, the second inner housing includes a front latch part configured to be latched to the latch reception part and a rear latch part configured to be latched to the second outer housing, and the rear latch part is provided on a second arm part extending toward the first optical connector along the direction of attaching and detaching, the rear latch part is latched to the second outer housing before the first optical connector and the second optical connector are connected to each other, and the latch release part releases a latch of the rear latch part by relatively moving the first optical connector and the second optical connector to a connection side, after the front latch part is latched to the latch reception part. With such an optical connector system, the size of the optical connector system in which fitting of the housings together is performed in the two stages can be reduced.

In a state where the front latch part is latched to the latch reception part, the first housing and the second inner housing may have a predetermined positional relationship, and in a state where the latch of the rear latch part is released, the second inner housing is movable with respect to the second outer housing. In this way, the size of the optical connector system in which fitting of the housings together is performed in the two stages can be reduced.

The latch release part may be located in a position adjacent to the latch reception part and close to the second optical connector. In this way, the size of the optical connector system in which fitting of the housings together is performed in the two stages can be reduced.

A location of the front latch part may be closer to the first optical connector than the rear latch part. In this way, the size of the optical connector system in which fitting of the housings together is performed in the two stages can be reduced.

Overall Structure of Optical Connector System 10

Figure 3A:
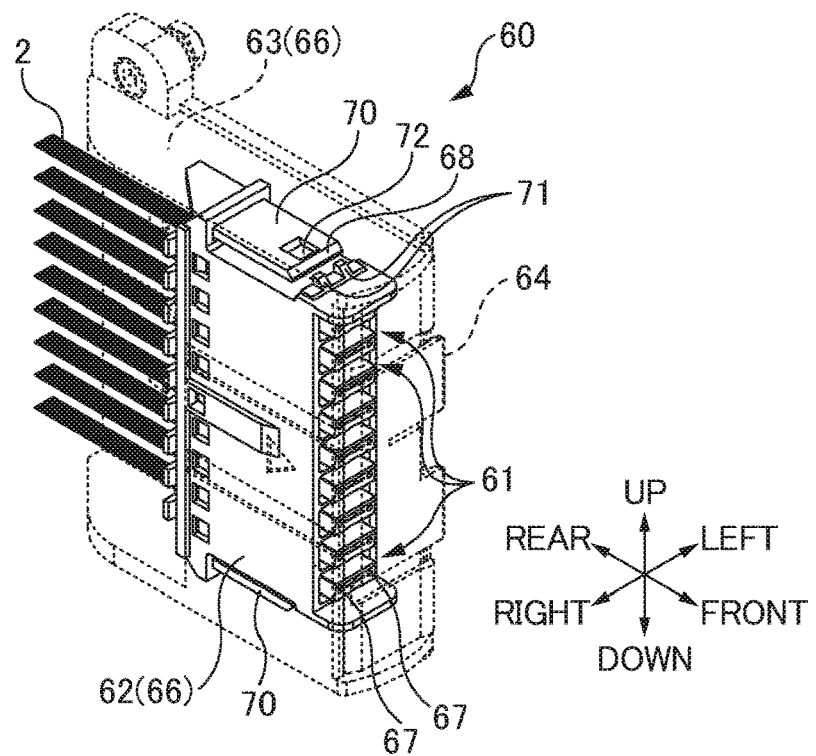
FIG. 3A is a perspective view of a movable-side optical connector 60 before the connector connection.

FIGS. 1A and 1B are perspective views of an optical connector system 10 before connector connection. FIGS. 2A and 2B are perspective views of the optical connector system 10 after the connector connection. FIG. 3A is a perspective view of a movable-side optical connector 60 before the connector connection. Note that in FIG. 1A, a broken line illustrates a plug-in unit 15 to which a reception-side optical connector 20 and the movable-side optical connector 60 are attached. In FIGS. 1B, 2B, and 3A, a broken line illustrates a part of the optical connector system 10 to illustrate a situation of the inside of the reception-side optical connector 20 or the movable-side optical connector 60.

In the following description, directions will be defined as illustrated in the drawings. Specifically, a direction of attaching/detaching of the optical connector system 10 is a "front-rear direction", and a counterpart side of connection is the "front" and the opposite side is the "rear" for each of the reception-side optical connector 20 and the movable-side optical connector 60. A width direction of a reception-side ferrule 21 and a movable-side ferrule 61 is a "left-right direction". Note that, in the reception-side ferrule 21, a direction in which a pair of ferrule pins 25 are aligned (cf. FIG. 3B described later) is also a "left-right direction". A thickness direction of the reception-side ferrule 21 and the movable-side ferrule 61 is an "up-down direction". Note that the up-down direction is also a direction orthogonal to the "front-rear direction" and the "left-right direction".

The optical connector system 10 is an optical connector system for connecting multicore optical fibers to each other. As illustrated in FIGS. 1B and 3A, in the optical connector system 10 according to one or more embodiments, nine 12-core-type ferrules (the reception-side ferrules 21 and the movable-side ferrules 61) are aligned in the up-down direction. Therefore, in the optical connector system 10 according to one or more embodiments, optical fibers with a total of 108 cores can be connected to each other. However, the number of cores of optical fibers held by ferrules and the number of ferrules of the optical connector system 10 are not limited thereto.

The optical connector system 10 according to one or more embodiments is an optical connector system constituted by a so-called backplane connector. The backplane connector is a plug-in-type optical connector constituting an optical connector adapter that connects an optical connector on a backplane board side and an optical connector on a printed board side. As illustrated in FIG. 1A, in the optical connector system 10 according to one or more embodiments, a backplane board 16 and a printed board 18 constitute the plug-in unit 15. Then, as illustrated in FIG. 2A, the movable-side optical connector 60 and the reception-side optical connector 20 are connector-connected to each other by fitting a housing (movable-side housing 66) of the movable-side optical connector 60 attached to the printed board 18 into a housing (reception-side housing 22) of the reception-side optical connector 20 attached to the backplane board 16.

When the optical connector system 10 is connector-connected, an operator moves the printed board 18 to which the movable-side optical connector 60 is attached toward the backplane board 16 to which the reception-side optical connector 20 is attached (cf. an arrow in FIG. 1A). At this time, the operator slides and moves the printed board 18 along a guide groove 72 formed in a lower part of the backplane board 16 in the plug-in unit 15. The movable-side optical connector 60 and the reception-side optical connector 20 are connector-connected to each other by sliding and moving the printed board 18 to the backplane board 16 side, and fitting the movable-side housing 66 into the reception-side housing 22. At this time, connecting end faces of the reception-side ferrule 21 and the movable-side ferrule 61 abut each other. By the connector connection between the movable-side optical connector 60 and the reception-side optical connector 20, reception-side optical fibers 1 held with the reception-side ferrule 21 and movable-side optical fibers 2 held with the movable-side ferrule 61 are optically connected to each other. Note that, as long as the optical connector system 10 according to one or more embodiments is an optical connector system in which the reception-side optical fibers 1 and the movable-side optical fibers 2 are optically connected to each other, the optical connector system 10 may not be constituted by a backplane connector.

The optical connector system 10 includes the reception-side optical connector 20 (hereinafter may be referred to as a "first optical connector") and the movable-side optical connector 60 (hereinafter may be referred to as a "second optical connector").

Structure of Reception-side Optical Connector 20 (First Optical Connector)

The reception-side optical connector 20 serves as an optical connector on the reception side at the time of connector connection of the optical connector system 10. In one or more embodiments, the optical connector system 10 is connector-connected by inserting the movable-side optical connector 60 into the reception-side optical connector 20. The connector connection of the optical connector system 10 is released by pulling out the movable-side optical connector 60 from the reception-side optical connector 20. As described above, the reception-side optical connector 20 is attached to the backplane board 16 side of the plug-in unit 15.

The reception-side optical connector 20 includes reception-side ferrules 21 (hereinafter may be referred to as a "first ferrule" or "first ferrules"), the reception-side housing 22 (hereinafter may be referred to as a "first housing"), a cover 23, and a reception-side shutter 24.

Each reception-side ferrule 21 is a member that holds an end part of the reception-side optical fiber 1. The reception-side ferrule 21 is, for example, a ferrule of a mechanically transferable (MT) optical connector (optical connector defined by JIS C 5981). As illustrated in FIG. 1B, in the optical connector system 10 according to one or more embodiments, the nine reception-side ferrules 21 are aligned in the up-down direction in the reception-side housing 22. However, the number and an alignment direction of the reception-side ferrules 21 are not limited thereto.

An endface on the front side of the reception-side ferrule 21 is a connecting end face when the optical connector system 10 is connector-connected. A reception-side ferrule flange part 27 (cf. FIG. 4A described later) is formed on a rear part of the reception-side ferrule 21. The reception-side ferrule flange part 27 is a flange section that protrudes outward from a peripheral surface of a body of the reception-side ferrule 21. The reception-side ferrule flange part 27 contacts a front exit prevention part 34 (cf. FIG. 4A described later) formed inside the reception-side housing 22, thereby preventing a front exit of the reception-side ferrule 21 pressed forward by a reception-side spring 26 (described later).

Note that the reception-side spring 26 is provided on the rear side of the reception-side ferrule 21 (cf. FIG. 4A described later). The reception-side spring 26 is an elastic member that restores a positional relationship between the reception-side ferrule 21 and the reception-side housing 22. The reception-side spring 26 is disposed in a compressible state between the rear part of the reception-side ferrule 21 and a spring reception part (not illustrated) provided on the reception-side housing 22. Specifically, a front end part of the reception-side spring 26 is held with the rear part of the reception-side ferrule 21, and a rear end part of the reception-side spring 26 is held with the spring reception part (not illustrated) provided on the reception-side housing 22. The connecting end face of the movable-side ferrule 61 abuts the connecting end face of the corresponding reception-side ferrule 21 during the connector connection of the optical connector system 10. When the reception-side ferrule 21 moves rearward with respect to the reception-side housing 22, the reception-side spring 26 is compressed and deformed. The reception-side ferrule 21 is biased forward by an elastic force of the compressed and deformed reception-side spring 26. The reception-side ferrule 21 can be pressed rearward against the elastic force of the reception-side spring 26.

The reception-side housing 22 is a member that houses the plurality of reception-side ferrules 21. The reception-side housing 22 is a tubular member extending in the front-rear direction, and houses the plurality of (herein, nine) reception-side ferrules 21 therein in the up-down direction. Note that the reception-side housing 22 may be integrally formed with the cover 23. A detailed configuration of the reception-side housing 22 will be described later.

The cover 23 is a member that houses the plurality of reception-side ferrules 21 and a reception-side arm part 30 (described later) of the reception-side housing 22. The cover 23 is a tubular member extending in the front-rear direction, and is provided on the front side (movable-side optical connector 60 side) of the reception-side housing 22. In one or more embodiments, the cover 23 is provided separately from the reception-side housing 22, but may be integrally formed with the reception-side housing 22.

The reception-side shutter 24 is a member that blocks an opening on the front side of the cover 23 (cf. FIG. 1A). The reception-side shutter 24 blocks the opening on the front side of the cover 23, and thus adhesion of dust to the reception-side ferrules 21 can be suppressed. The reception-side shutter 24 is formed in a plate shape. In the reception-side optical connector 20 before the connector connection illustrated in FIG. 1A, the reception-side shutter 24 is in a closed state and is vertical to the front-rear direction (direction of attaching/detaching of the optical connector system 10). Then, the reception-side shutter 24 can be inclined to the inside (rear side, side opposite to the movable-side optical connector 60) and open. As illustrated in FIGS. 7A to 7D described later, the reception-side shutter 24 in an open state is vertical to the left-right direction.

Structure of Movable-side Optical Connector 60 (Second Optical Connector)

The movable-side optical connector 60 is an optical connector on the movable side at the time of the connector connection of the optical connector system 10. As described above, in one or more embodiments, the optical connector system 10 is connector-connected by inserting the movable-side optical connector 60 into the reception-side optical connector 20. The connector connection of the optical connector system 10 is released by pulling out the movable-side optical connector 60 from the reception-side optical connector 20. As described above, the movable-side optical connector 60 is attached to the printed board 18 side of the plug-in unit 15.

The movable-side optical connector 60 includes movable-side ferrules 61 (hereinafter may be referred to as a "second ferrule" or "second ferrules"), a movable-side inner housing 62 (hereinafter may be referred to as a "second inner housing"), a movable-side outer housing 63 (hereinafter may be referred to as a "second outer housing"), and a movable-side shutter 64. Note that the movable-side inner housing 62 and the movable-side outer housing 63 together may be referred to as the movable-side housing 66 (second housing).

Each movable-side ferrule 61 is a member that holds an end part of the movable-side optical fiber 2. Note that a movable-side spring 65 is provided on the rear side of the movable-side ferrule 61 (cf. FIG. 4B described later). The movable-side ferrule 61 and the movable-side spring 65 have a similar configuration as that of the reception-side ferrule 21 and the movable-side spring 65 described above, and thus description thereof will be omitted.

The movable-side inner housing 62 is a member that houses the plurality of movable-side ferrules 61. The movable-side inner housing 62 is a tubular member extending in the front-rear direction, and houses the plurality of (herein, nine) movable-side ferrules 61 therein in the up-down direction. As illustrated in FIGS. 1A to 3A, in one or more embodiments, the movable-side inner housing 62 is housed inside the movable-side outer housing 63. The movable-side inner housing 62 can move in the front-rear direction (direction of attaching/detaching of the optical connector system 10) with respect to the movable-side outer housing 63. However, as described later, a rear latch part 72 of the movable-side inner housing 62 and a latch protrusion 73 of the movable-side outer housing 63 are latched before the connector connection. Thus, a forward movement of the movable-side inner housing 62 with respect to the movable-side outer housing 63 is restricted before the connector connection. A detailed configuration of the movable-side inner housing 62 will be described later.

The movable-side outer housing 63 is a member that houses the movable-side inner housing 62. The movable-side outer housing 63 is a tubular member extending in the front-rear direction, and houses the movable-side inner housing 62 therein. A detailed configuration of the movable-side outer housing 63 will be described later.

The movable-side shutter 64 is a member that blocks an opening on the front side of the movable-side outer housing (cf. FIG. 3A). The movable-side shutter 64 blocks the opening on the front side of the movable-side outer housing 63, and thus adhesion of dust to the movable-side ferrules 61 can be suppressed. The movable-side shutter 64 is formed in a plate shape. In the movable-side optical connector 60 before the connector connection illustrated in FIG. 3A, the movable-side shutter 64 is in a closed state and is vertical to the front-rear direction (direction of attaching/detaching of the optical connector system 10). Then, the movable-side shutter 64 can be inclined to the outside (front side, the reception-side optical connector 20 side) and opened. As illustrated in FIGS. 7A to 7D described later, the movable-side shutter 64 in an open state is vertical to the left-right direction.

Detailed Structure of Reception-side Housing 22 and Movable-side Housing 66

Figure 3B:
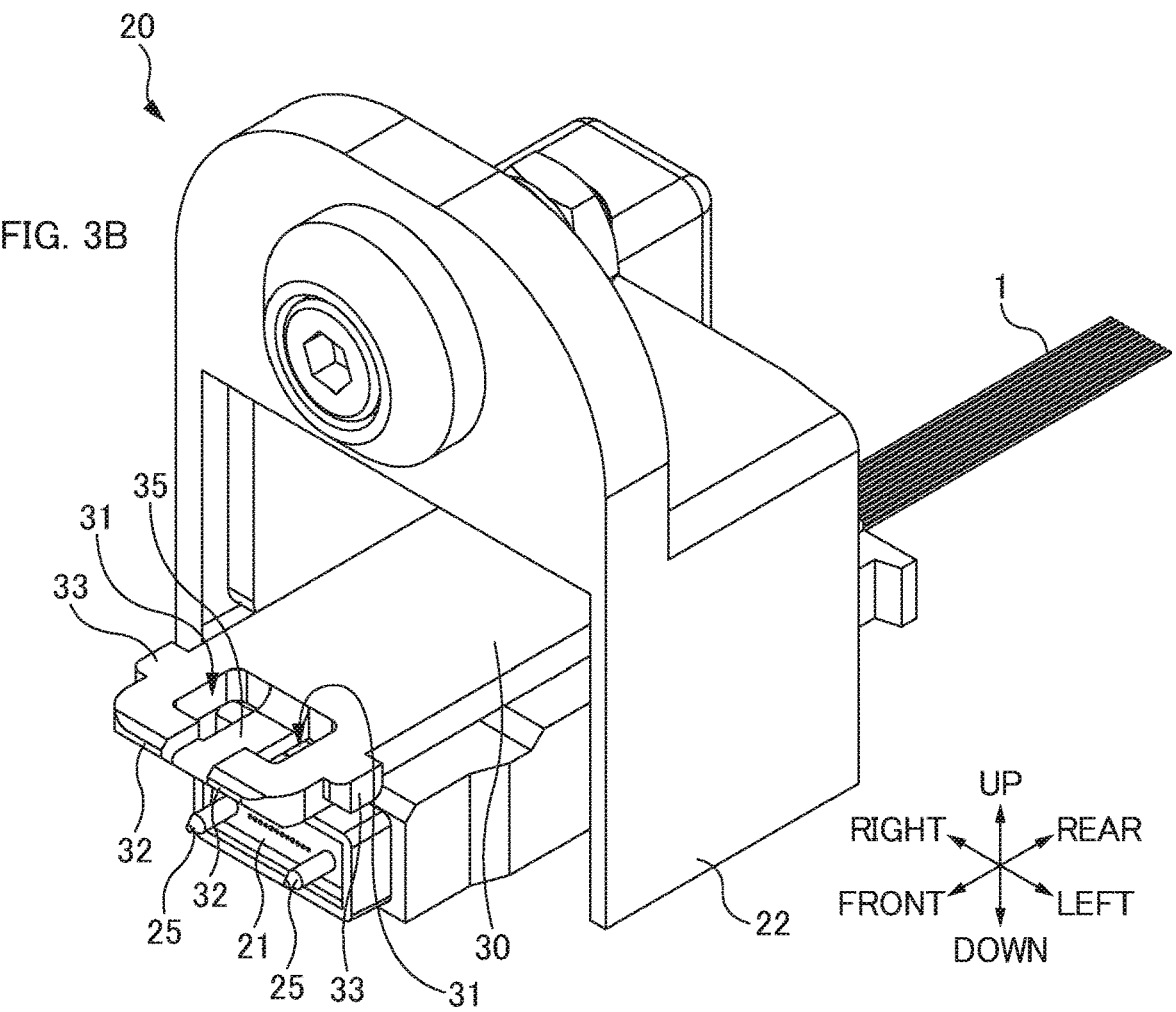
FIG. 3B is a perspective view of an enlarged part of a reception-side arm part 30 of a reception-side optical connector 20.

FIG. 3B is a perspective view of an enlarged part of the reception-side arm part 30 of the reception-side optical connector 20. FIG. 4A is a cross-sectional view of the reception-side optical connector 20. FIG. 4B is a cross-sectional view of the movable-side optical connector 60. Note that FIGS. 4A and 4B are cross-sectional views when the reception-side optical connector 20 and the movable-side optical connector 60 are cut in a plane vertical to the left-right direction.

As described above, in the optical connector system 10 according to one or more embodiments, the movable-side optical connector 60 and the reception-side optical connector 20 are connector-connected to each other by fitting the movable-side housing 66 of the movable-side optical connector 60 into the reception-side housing 22 of the reception-side optical connector 20. In the optical connector system 10 according to one or more embodiments, fitting of the movable-side housing 66 and the reception-side housing 22 together is performed in two stages. In a first stage (hereinafter may be referred to as "first fitting") of fitting, a front latch part 71 of the movable-side inner housing 62 (movable-side housing 66) is latched to a latch reception part 31 of the reception-side housing 22, and thus the reception-side housing 22 and the movable-side housing 66 have a predetermined positional relationship. In a second stage (hereinafter may be referred to as "second fitting") of fitting, a latch of the latch protrusion 73 of the movable-side outer housing 63 with respect to the rear latch part 72 of the movable-side inner housing (movable-side housing 66) is released, and thus the movable-side inner housing 62 can move with respect to the movable-side outer housing 63. After the second stage of fitting, the movable-side inner housing 62 is in a floating state of being able to move with respect to the movable-side outer housing 63 while the movable-side inner housing 62 and the reception-side housing 22 remain in the predetermined positional relationship.

Note that the two-stage fitting of the movable-side housing 66 and the reception-side housing 22 can be performed by the operator moving the printed board 18 to which the movable-side optical connector 60 is attached toward the backplane board 16 to which the reception-side optical connector 20 is attached. An example of a backplane connector in which the movable-side housing 66 (movable-side optical connector 60) is moved with respect to the reception-side housing 22 (reception-side optical connector 20) is illustrated below. However, in a case of the optical connector system 10 other than the backplane connector, both optical connectors (housings) may be moved so as to be brought closer to each other.

The reception-side housing 22 includes reception-side arm parts 30 (hereinafter may be referred to as a "first arm part" or "first arm parts") (cf. FIGS. 3B and 4A). The reception-side arm part 30 is a section that fits the movable-side housing and the reception-side housing 22 together. The reception-side arm part 30 is a section extending to the front side (movable-side optical connector 60 side) along the front-rear direction (direction of attaching/detaching of the optical connector system 10). As illustrated in FIG. 1B described above, the reception-side housing 22 according to one or more embodiments includes two reception-side arm parts 30 on an upper side and a lower side so as to sandwich the plurality of reception-side ferrules 21. In this way, the two reception-side arm parts 30 on the upper and lower sides fit the movable-side housing 66 and the reception-side housing 22 together, and thus misalignment of fitting between upper parts and lower parts of both the housings can be suppressed. Note that the reception-side arm part 30 provided on the upper side will be described below. The reception-side arm part 30 provided on the lower side has a similar configuration except for an inverted position in the up-down direction, and thus description thereof will be omitted.

As illustrated in FIG. 3B, latch reception parts 31, latch release parts 32, ear parts 33, and an escape part 35 are formed on a front part of the reception-side arm part 30.

The latch reception part 31 is a section latched to the front latch part 71 of the movable-side inner housing 62. As described later, two front latch parts 71 are aligned in the left-right direction and provided on the movable-side inner housing 62. Thus, two latch reception parts 31 are aligned in the left-right direction and provided so as to correspond to the respective two front latch parts 71. Each latch reception part 31 is formed so as to penetrate the front part of the reception-side arm part 30 in the up-down direction. The front latch part 71 is hooked on a front inner wall in the penetrating part, and thus the front latch part 71 is latched to the latch reception part 31. Note that, as described later, the front latch part 71 is formed so as to protrude upward, and a tip of the front latch part 71 is latched to the latch reception part 31 being hooked from a lower opening of the latch reception part 31.

The latch release part 32 is a section capable of releasing a latch between the rear latch part 72 of the movable-side inner housing 62 and the latch protrusion 73 of the movable-side outer housing 63. When the movable-side optical connector 60 moves forward with respect to the reception-side optical connector 20, the latch release part 32 is brought into contact with a push surface 68 of a movable-side arm part 70 (movable-side inner housing 62) described later, and elastically deforms and pushes down the movable-side arm part 70. In this way, the latch of the latch protrusion 73 with respect to the rear latch part 72 can be released. The latch release part 32 is formed on a front end part of the reception-side arm part 30. As described later, the escape part 35 having a groove shape along the front-rear direction is formed on a central part of the reception-side arm part 30, and the latch release part 32 is not formed on a part of the reception-side arm part 30 on which the escape part 35 is formed. In other words, the front end part of the reception-side arm part 30 has the central part having a recessed shape due to the escape part 35, and this part is a part on which the latch release part 32 is not formed. Therefore, two latch release parts 32 are aligned in the left-right direction and provided on the front end part of the reception-side arm part 30 (cf. FIG. 3B).

Figure 4A:
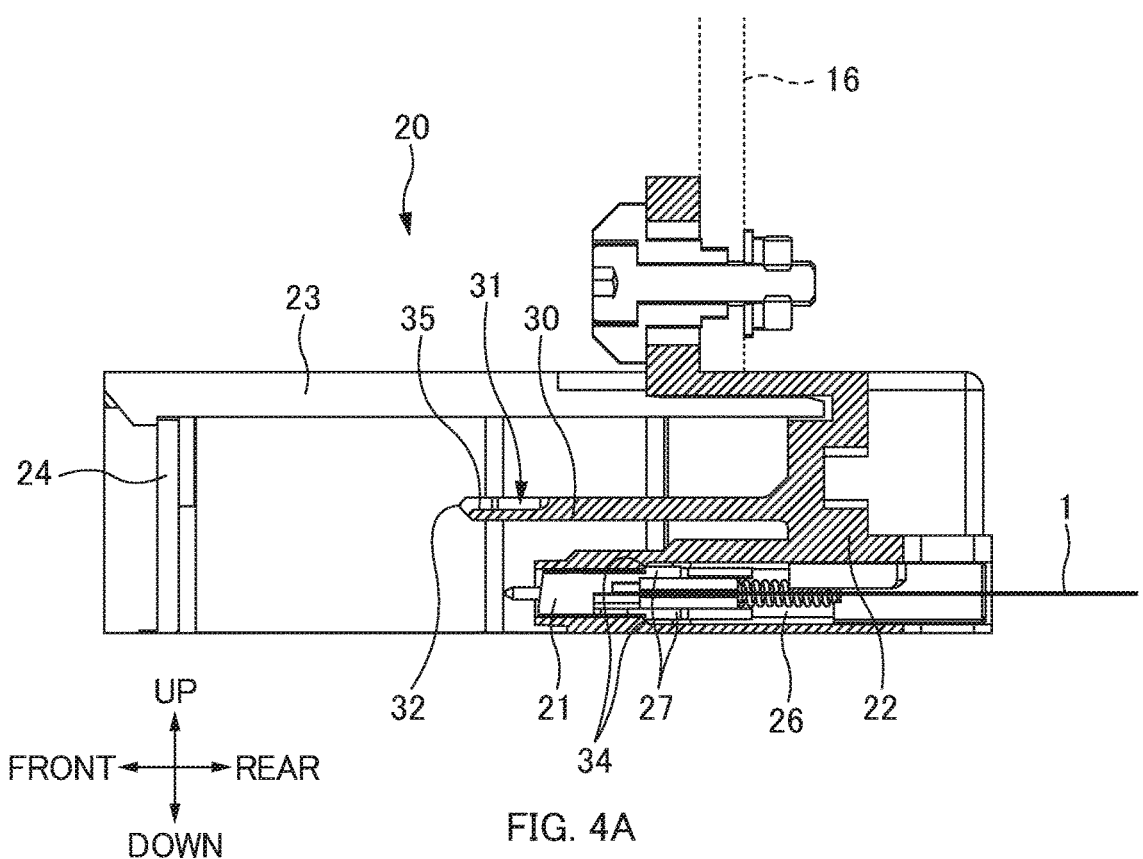
FIG. 4A is a cross-sectional view of the reception-side optical connector 20.
Figure 4B:
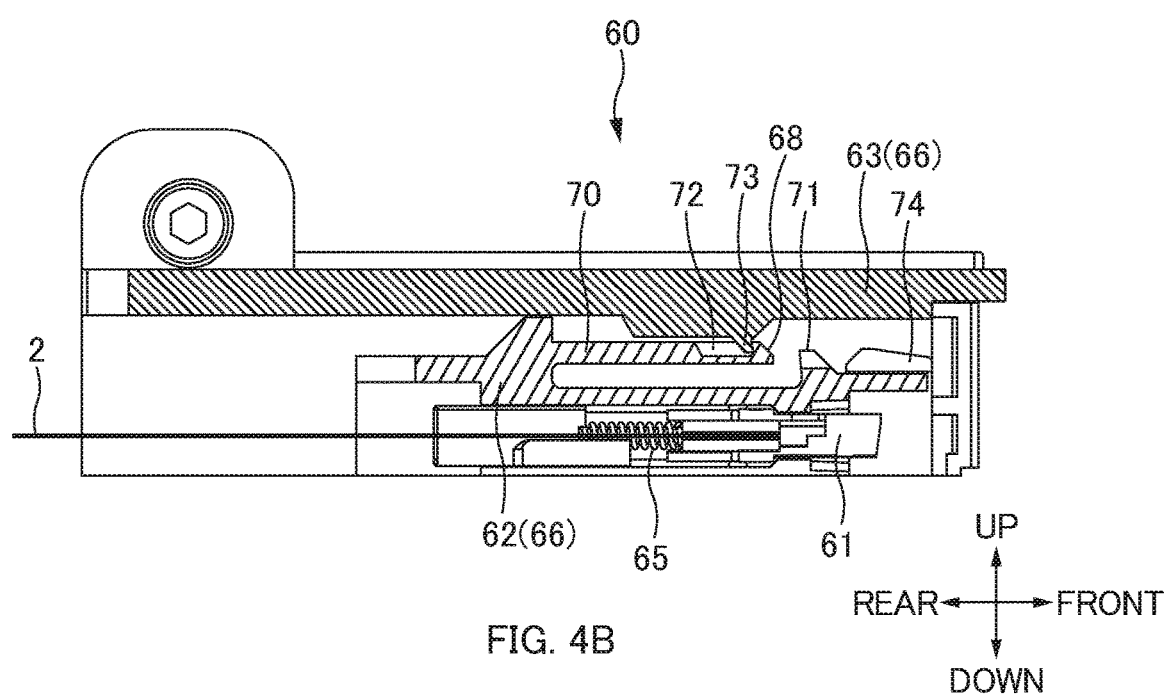
FIG. 4B is a cross-sectional view of the movable-side optical connector 60.

A lower part of each latch release part 32 is formed by an inclined surface facing downward (cf. FIG. 4A). As described later, the push surface 68 of the movable-side arm part 70 (movable-side inner housing 62) is formed by an inclined surface facing upward. When the movable-side optical connector 60 moves forward with respect to the reception-side optical connector 20, the downward inclined surface of the latch release part 32 is brought into contact with the upward inclined surface of the push surface 68, and further presses the push surface 68 forward, and thus the movable-side arm part 70 can be elastically deformed and pushed down.

The latch release part 32 is provided in a position adjacent to the front side (movable-side optical connector 60 side) with respect to the latch reception parts 31. In this way, when the movable-side optical connector 60 moves in the front-rear direction (direction of attaching/detaching of the optical connector system 10) with respect to the reception-side optical connector 20, the sections of the reception-side arm part 30 perform both of the first stage of fitting and the second stage of fitting. In other words, the front latch part 71 of the movable-side inner housing 62 is latched to the latch reception part 31 of the reception-side arm part 30 (first stage of fitting), and the latch release part 32 of the reception-side arm part 30 releases a latch of the latch protrusion 73 of the movable-side outer housing 63 with respect to the rear latch part 72 of the movable-side inner housing 62 (second stage of fitting). Therefore, a single member being the reception-side arm part 30 is enough without a need to provide each different member for the first stage of fitting and the second stage of fitting, and thus the size of the optical connector system in which two-stage fitting of the housings together is performed can be reduced.

Each ear part 33 is a section configured to ride on a ridden part 74 of the movable-side outer housing 63 when the connector connection of the optical connector system 10 is released. Two ear parts 33 are formed on both left and right sides of the front part of the reception-side arm part 30, and each of the ear parts 33 is formed so as to protrude outward (to the side opposite to the escape part 35).

The escape part 35 is a section capable of moving the latch protrusion 73 in the front-rear direction without being in contact with the reception-side arm part 30 after a latch between the rear latch part 72 of the movable-side inner housing 62 and the latch protrusion 73 of the movable-side outer housing 63 is released. The escape part 35 is formed in the central part of the reception-side arm part 30. The escape part 35 is a section having a groove shape along the front-rear direction. An upper surface of the escape part 35 is a part being recessed from an upper surface of the reception-side arm part 30. A front end part of the escape part 35 is also a part being recessed from a front end part of the latch release part 32. The latch protrusion 73 passes through such a recessed part, and can thus move in the front-rear direction without being in contact with the reception-side arm part 30.

The front latch parts 71 are formed on a front part of the movable-side inner housing 62. Each front latch part 71 is a section to be latched to the latch reception part 31 of the reception-side arm part 30 (reception-side housing 22). The front latch part 71 is formed so as to protrude upward. The front latch part 71 is provided on the front side (reception-side optical connector 20 side) with respect to the rear latch part 72 described later.

The movable-side inner housing 62 includes movable-side arm parts 70 (hereinafter may be referred to as a "second arm part" or "second arm parts"). Each movable-side arm part 70 is a section extending to the front side (reception-side optical connector 20 side) along the front-rear direction (direction of attaching/detaching of the optical connector system 10). As illustrated in FIG. 3A, the movable-side inner housing 62 according to one or more embodiments includes two movable-side arm parts 70 on an upper side and a lower side so as to sandwich the plurality of movable-side ferrules 61. Note that the movable-side arm part 70 provided on the upper side will be described below. The movable-side arm part 70 provided on the lower side has a similar configuration except for an inverted position in the up-down direction, and thus description thereof will be omitted.

The rear latch part 72 is formed in a front part of the movable-side arm part 70. The rear latch part 72 is a section latched to the latch protrusion 73 of the movable-side outer housing 63. The rear latch part 72 is a recessed part formed on an upper surface of the movable-side arm part 70. The latch protrusion 73 is hooked on a front inner wall in the recessed part, and thus the latch protrusion 73 is latched to the rear latch part 72.

The latch protrusion 73 is formed on the movable-side outer housing 63. The latch protrusion 73 is a section latched to the rear latch part 72 of the movable-side inner housing 62. The latch protrusion 73 is latched to the rear latch part 72, and thus a forward movement of the movable-side inner housing with respect to the movable-side outer housing 63 is restricted. Note that, in the connector connection of the optical connector system 10, the latch protrusion 73 continues to be latched to the rear latch part 72 until the second stage of fitting is completed. In other words, in the connector connection of the optical connector system 10, a forward movement of the movable-side inner housing 62 with respect to the movable-side outer housing 63 remains in a restricted state until the second stage of fitting is completed.

As described above, the front latch parts 71 are provided on the front side (reception-side optical connector 20 side) with respect to the rear latch part 72. The latch release parts 32 are provided in the position adjacent to the front side (movable-side optical connector 60 side) with respect to the latch reception parts 31. In this way, when the movable-side optical connector 60 moves in the front-rear direction (direction of attaching/detaching of the optical connector system 10) with respect to the reception-side optical connector 20, the latch reception part 31 and the front latch part 71 are first latched (first stage of fitting), and the latch release part 32 then releases a latch of the latch protrusion 73 with respect to the rear latch part 72 (second stage of fitting). However, the front latch parts 71 may be provided on the rear side (side opposite to the reception-side optical connector 20) with respect to the rear latch part 72. The latch release parts 32 may be provided in a position adjacent to the rear side (side opposite to the movable-side optical connector 60) with respect to the latch reception parts 31.

Procedure of Connector Connection of Optical Connector System 10

First Stage of Fitting

Figure 5A:
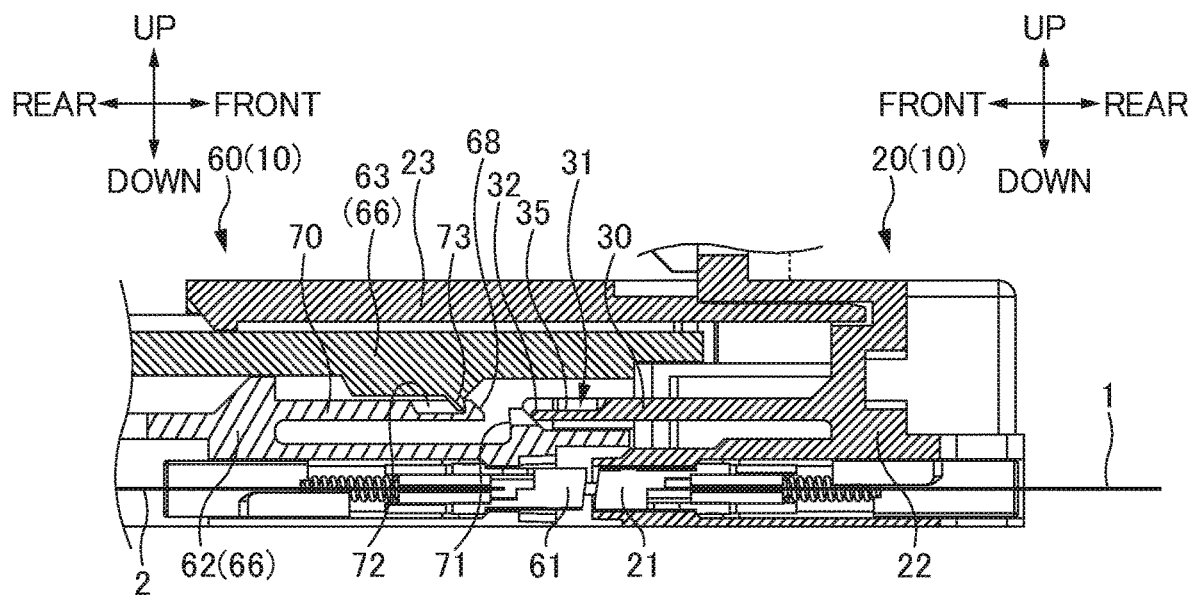
FIGS. 5A to 5C are cross-sectional views of when the optical connector system 10 in a first stage of fitting is cut in a plane vertical to a left-right direction.
Figure 5B:
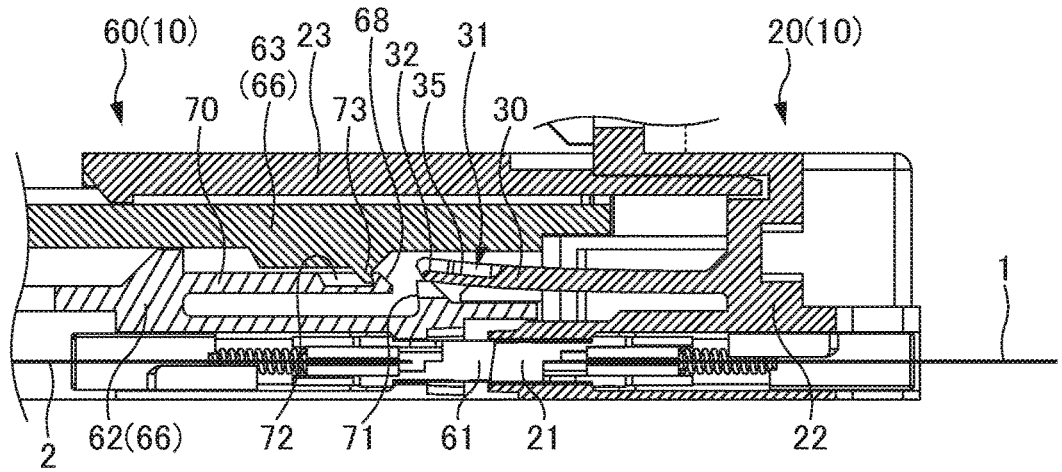
Figure 5C:
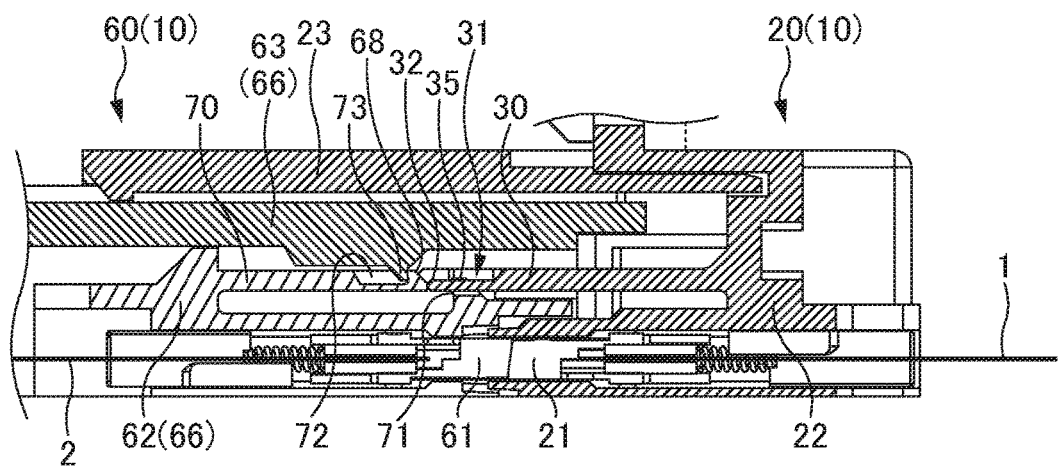

FIGS. 5A to 5C are cross-sectional views of when the optical connector system 10 in the first stage of fitting is cut in the plane vertical to the left-right direction. FIGS. 5A to 5C illustrate a situation from before the connector connection until the front latch part 71 of the movable-side inner housing is latched to the latch reception part 31 of the reception-side housing 22. Note that a part of the optical connector system 10 is omitted in FIGS. 5A to 5C in order to clearly illustrate the situation of fitting.

FIG. 5A illustrates a state before the connecting end face of the reception-side ferrule 21 and the connecting end face of the movable-side ferrule 61 abut each other. As illustrated in FIG. 5A, the pair of ferrule pins 25 of the reception-side ferrule 21 are inserted into ferrule holes 67 (not illustrated in FIG. 5A, cf. FIG. 3A) of the movable-side ferrule 61. In this way, positioning of abutting of the connecting end faces of the reception-side ferrule 21 and the movable-side ferrule 61 is performed.

In FIG. 5A, the front latch part 71 (movable-side inner housing 62) is in contact with the downward inclined surface of the latch release part 32 (reception-side arm part 30 (reception-side housing 22)). When the movable-side optical connector 60 moves forward with respect to the reception-side optical connector 20 from the state illustrated in FIG. 5A, the front latch part 71 is brought into contact with the downward inclined surface of the latch release part 32, and further presses the downward inclined surface of the latch release part forward, and thus the reception-side arm part 30 is elastically deformed and pushed up (state illustrated in FIG. 5B described later). In this way, the tip of the front latch part 71 can be latched to the latch reception part 31 in such a way as to be hooked from the lower opening of the latch reception part 31.

FIG. 5B illustrates a state where the connecting end face of the reception-side ferrule 21 and the connecting end face of the movable-side ferrule 61 abut each other. As described above, the reception-side ferrule 21 is biased (pressed) forward by the reception-side spring 26. The movable-side ferrule 61 is also biased (pressed) forward by the movable-side spring 65. Thus, when the movable-side optical connector 60 moves forward with respect to the reception-side optical connector 20 from the state illustrated in FIG. 5B, an elastic force of the reception-side spring 26 and the movable-side spring 65 that are compressed and deformed is applied. In other words, after the state illustrated in FIG. 5B, the operator moves the movable-side optical connector 60 forward with respect to the reception-side optical connector 20 against the elastic force of the reception-side spring 26 and the movable-side spring 65.

FIG. 5C illustrates a state where the front latch part 71 (movable-side inner housing 62) is latched to the latch reception part 31 (reception-side arm part 30 (reception-side housing 22)). In other words, FIG. 5C illustrates a state where the first stage of fitting is completed, and the reception-side housing 22 and the movable-side housing 66 have the predetermined positional relationship. In this way, an abutment plane (mechanical reference plane) of the connecting end face of the reception-side ferrule 21 and the connecting end face of the movable-side ferrule 61 is fixed. In the state where the front latch part 71 is latched to the latch reception part 31, the reception-side housing 22 and the movable-side housing 66 have the predetermined positional relationship with the connecting end face of the reception-side ferrule 21 and the connecting end face of the movable-side ferrule 61 abutting each other, and the reception-side spring 26 and the movable-side spring 65 are compressed and deformed by a predetermined amount. Thus, in the state where the front latch part 71 is latched to the latch reception part 31, the reception-side ferrule 21 and the movable-side ferrule 61 are fixed in a state of abutting each other with predetermined pressure with the reception-side spring 26 and the movable-side spring 65. In other words, in the state illustrated in FIG. 5C, an elastic force of the reception-side spring 26 and the movable-side spring 65 is applied to a latch part of the front latch part 71 and the latch reception part 31. Note that, in the stages in FIGS. 5A to 5C, the rear latch part 72 of the movable-side inner housing 62 is still latched with the latch protrusion 73 of the movable-side outer housing 63, and a forward movement of the movable-side inner housing 62 with respect to the movable-side outer housing 63 is restricted.

Second Stage of Fitting

FIGS. 6A to 6D are cross-sectional views of when the optical connector system 10 in the second stage of fitting is cut in the plane vertical to the left-right direction. FIGS. 7A to 7D are cross-sectional views of when the optical connector system 10 in the second stage of fitting is cut in a plane vertical to the up-down direction. FIGS. 6A to 6D (FIGS. 7A to 7D) illustrate a situation from a state where the latch release part 32 is in contact with a tip of the movable-side arm part 70 until the latch protrusion 73 is located on an upper part of the escape part 35 of the reception-side arm part 30. Note that a part of the optical connector system 10 is also omitted in FIGS. 6A to 7D in order to clearly illustrate the situation of fitting. Note that FIG. 6A illustrates the same state as FIG. 5C described above.

In FIG. 6A (FIG. 7A), the downward inclined surface of the latch release part 32 (movable-side arm part 30 (movable-side housing 22)) is in contact with the push surface 68 (upward inclined surface) of the movable-side arm part 70 (movable-side inner housing 62). When the movable-side optical connector 60 moves forward with respect to the reception-side optical connector 20 from the state illustrated in FIG. 6A (FIG. 7A), the downward inclined surface of the latch release part 32 is brought into contact with the push surface 68 of the movable-side arm part 70, and further presses the push surface 68 of the movable-side arm part 70 forward, and thus the movable-side arm part 70 is elastically deformed and pushed down (state illustrated in FIG. 6B described later). In this way, the latch of the latch protrusion 73 of the movable-side outer housing 63 with respect to the rear latch part 72 can be released.

FIG. 6B (FIG. 7B) illustrates a state immediately before the latch of the latch protrusion 73 (movable-side outer housing 63) with respect to the rear latch part 72 (movable-side inner housing 62) is released. In other words, FIG. 6B (FIG. 7B) illustrates a state where the movable-side inner housing 62 can move forward with respect to the movable-side outer housing 63. In this way, the movable-side inner housing 62 can move forward with respect to the movable-side outer housing 63 while the movable-side inner housing 62 and the reception-side housing 22 remain in the predetermined positional relationship.

FIG. 6C (FIG. 7C) illustrates a state immediately after the latch of the latch protrusion 73 (movable-side outer housing 63) with respect to the rear latch part 72 (movable-side inner housing 62) is released. The movable-side arm part 70 pushed down in the state illustrated in FIG. 6B (FIG. 7B) moves upward again by an elastic force, and returns to the original position (state illustrated in FIG. 6A (FIG. 7A)). FIG. 6C (FIG. 7C) illustrates a state where the latch protrusion 73 having the latch to the rear latch part 72 being released can move to the escape part 35 side of the reception-side arm part 30 (reception-side housing 22). As described above, the escape part 35 is a part being recessed from the front end part of the reception-side arm part 30, and by the latch protrusion 73 passing through the escape part 35, the latch protrusion 73 can move to the front side (reception-side optical connector 20 side) without being in contact with the reception-side arm part 30.

FIG. 6D (FIG. 7D) illustrates a state where the latch protrusion 73 further moves forward from the state illustrated in FIG. 6C (FIG. 7C). At this time, the tip of the latch protrusion 73 is in contact with the upper surface of the escape part 35 of the reception-side arm part 30. Note that, at this time, the latch reception part 31 is still latched to the front latch part 71 of the movable-side inner housing 62. In other words, the latch protrusion 73 is located so as to sandwich the latch reception part 31 (reception-side arm part 30) between the front latch part 71 and the latch protrusion 73. In this way, for example, when vibration is applied to the optical connector system 10, the reception-side arm part 30 moves upward. Even when the latch by the front latch part 71 is to be unlatched, the tip of the latch protrusion 73 presses the escape part 35 (reception-side arm part 30) in a downward direction, and thus an upward movement of the reception-side arm part 30 is restricted. In this way, an unintentional unlatch of the latch (first stage of fitting) of the front latch part 71 to the latch reception part 31 of the reception-side arm part 30 can be suppressed. However, as long as an unintentional unlatch of the latch (first stage of fitting) of the front latch part 71 to the latch reception part 31 of the reception-side arm part 30 can be suppressed, the tip of the latch protrusion 73 may not be in contact with the upper surface of the escape part 35 of the reception-side arm part 30.

Procedure of Releasing Connector Connection of Optical Connector System 10

Figure 8A:
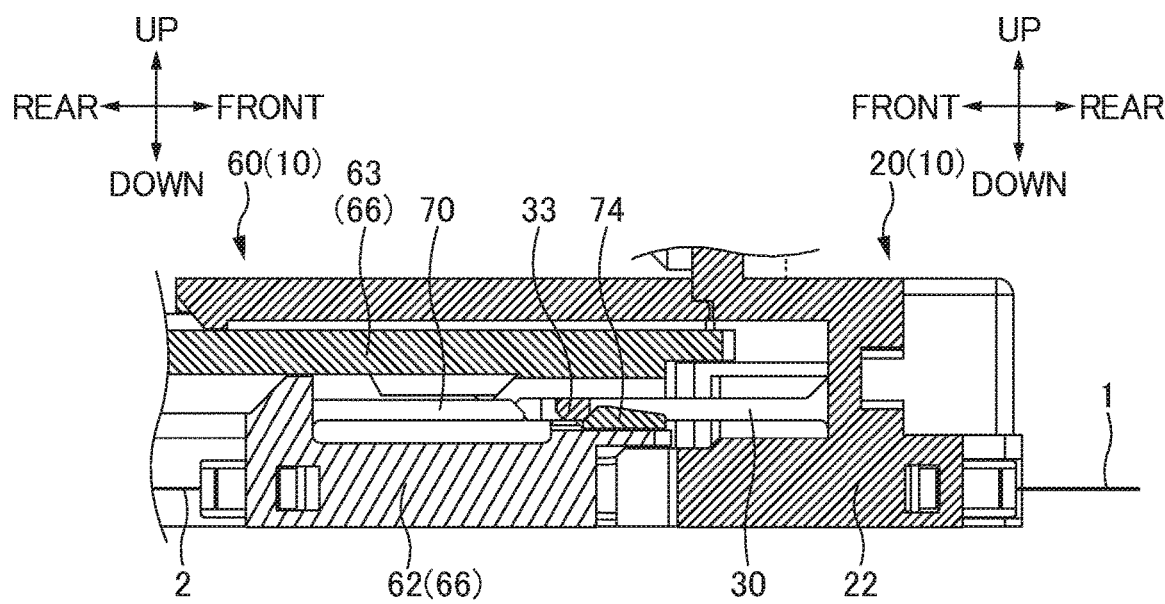
FIGS. 8A to 8C are cross-sectional views when the optical connector system 10 in a release stage of fitting is cut in the plane vertical to the left-right direction.
Figure 8B:
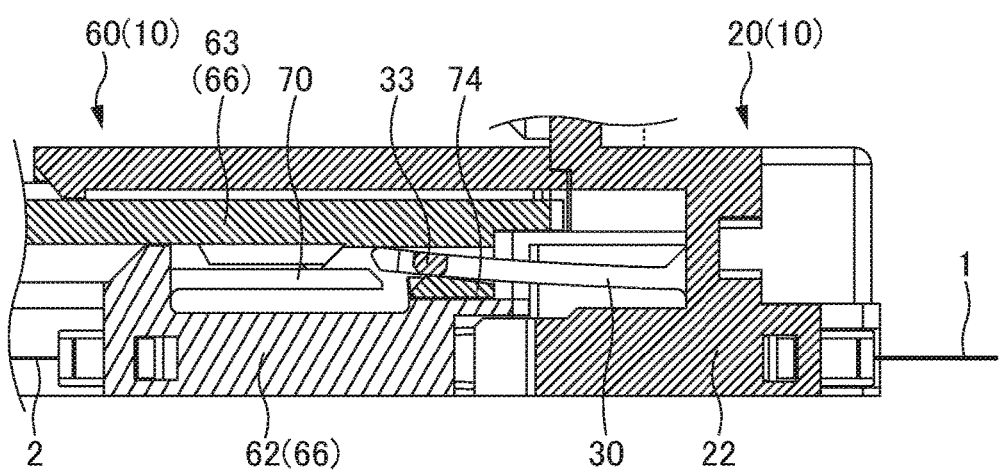
Figure 8C:
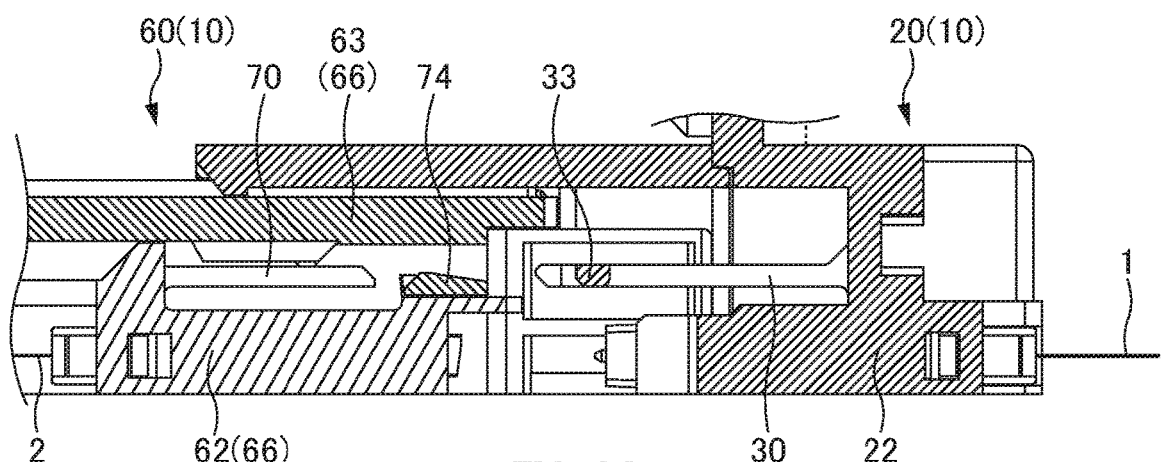

FIGS. 8A to 8C are cross-sectional views of when the optical connector system 10 in a release stage of fitting is cut in the plane vertical to the left-right direction.

Before the connector connection of the optical connector system 10 is released, i.e., before the movable-side optical connector 60 is pulled out from the reception-side optical connector 20, the latch of the latch protrusion 73 (movable-side outer housing 63) with respect to the rear latch part 72 (movable-side inner housing 62) is released. Thus, the movable-side inner housing 62 can move in the front-rear direction with respect to the movable-side outer housing 63 while the movable-side inner housing 62 and the reception-side housing 22 remain in the predetermined positional relationship.

When the movable-side optical connector 60 moves rearward with respect to the reception-side optical connector 20, the latch protrusion 73 (movable-side outer housing 63) is latched again with respect to the rear latch part 72 (movable-side inner housing 62) in the illustrated order from FIG. 6C (FIG. 7C) to FIG. 6A (FIG. 7A) described above. In other words, a movement of the movable-side inner housing 62 in the front-rear direction with respect to the movable-side outer housing 63 is restricted again.

In FIG. 8A, the ear part 33 of the reception-side arm part 30 (reception-side housing 22) is in contact with the ridden part 74 of the movable-side outer housing 63. When the movable-side optical connector 60 moves rearward with respect to the reception-side optical connector 20 from the state illustrated in FIG. 8A, the ear part 33 is brought into contact with the ridden part 74, and the ear part 33 is further pressed rearward, and thus the reception-side arm part 30 is elastically deformed and pushed up (states illustrated in FIGS. 8B and 8C described later). In this way, the tip of the front latch part 71 can be unlatched from the lower opening of the latch reception part 31.

As illustrated in FIGS. 1A to 3A, the optical connector system 10 according to one or more embodiments includes the reception-side optical connector 20 (first optical connector) including the reception-side ferrule 21 (first ferrule) and the reception-side housing 22 (first housing) that houses the reception-side ferrule 21, and the movable-side optical connector 60 (second optical connector) that includes the movable-side ferrule 61 (second ferrule) connected to the reception-side ferrule 21, the movable-side inner housing 62 (second inner housing) that houses the movable-side ferrule 61, and the movable-side outer housing 63 (second outer housing) that houses the movable-side inner housing 62, and is attachable to and detachable from the reception-side optical connector 20.

Then, in one or more embodiments, as illustrated in FIGS. 3B, 4A, and 4B, the reception-side housing 22 includes the latch reception part 31 and the latch release part 32, and the latch reception part 31 and the latch release part 32 are provided on the reception-side arm part 30 (first arm part) extending toward the movable-side optical connector 60 along the direction of attaching/detaching of the reception-side optical connector 20 and the movable-side optical connector 60, and the movable-side inner housing 62 includes the front latch part 71 configured to be latched to the latch reception part 31 and the rear latch part 72 configured to be latched to the movable-side outer housing 63, and the rear latch part 72 is provided on the movable-side arm part 70 (second arm part) extending toward the reception-side optical connector 20 along the direction of attaching/detaching of the reception-side optical connector 20 and the movable-side optical connector 60.

Furthermore, in one or more embodiments, as illustrated in FIGS. 5A to 7D, the rear latch part 72 is latched to the movable-side outer housing 63 before the reception-side optical connector 20 and the movable-side optical connector 60 are connected to each other, and the latch release part 32 releases a latch of the rear latch part 72 after the front latch part 71 is latched to the latch reception part 31 by relatively moving the reception-side optical connector 20 and the movable-side optical connector 60 to a connection side.

In this way, in one or more embodiments, the size of the optical connector system 10 in which two-stage fitting of the housings together is performed can be reduced.

In the optical connector system 10 according to one or more embodiments, as illustrated in FIGS. 5A to 7D, in the state where the front latch part 71 is latched to the latch reception part 31, the reception-side housing 22 and the movable-side inner housing 62 have the predetermined positional relationship, and in the state where a latch of the rear latch part 72 is released, the movable-side inner housing 62 is movable with respect to the movable-side outer housing 63. In this way, in one or more embodiments, the size of the optical connector system 10 in which two-stage fitting of the housings together is performed can be reduced.

In the optical connector system 10 according to one or more embodiments, as illustrated in FIG. 4A, the latch release part 32 is provided in the position adjacent to the movable-side optical connector 60 side with respect to the latch reception part 31. In this way, in one or more embodiments, the size of the optical connector system 10 in which two-stage fitting of the housings together is performed can be reduced.

In the optical connector system 10 according to one or more embodiments, as illustrated in FIG. 4B, the front latch part 71 is provided on the reception-side optical connector 20 side with respect to the rear latch part 72. In this way, in one or more embodiments, the size of the optical connector system 10 in which two-stage fitting of the housings together is performed can be reduced.

Other

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Reception-side optical fiber;
2 Movable-side optical fiber;
10 Optical connector system;
15 Plug-in unit;
16 Backplane board;
17 Guide groove;
18 Printed board;
20 Reception-side optical connector (first optical connector);
21 Reception-side ferrule (first ferrule);
22 Reception-side housing (first housing);
23 Cover;
24 Reception-side shutter;
25 Ferrule pin;
26 Reception-side spring;
27 Reception-side ferrule flange part;
30 Reception-side arm part (first arm part);
31 Latch reception part;
32 Latch release part;
33 Ear part;
34 Front exit prevention part;
35 Escape part;
60 Movable-side optical connector (second optical connector);
61 Movable-side ferrule (second ferrule);
62 Movable-side inner housing (second inner housing);
63 Movable-side outer housing (second outer housing);
64 Movable-side shutter;
65 Movable-side spring;
66 Movable-side housing (second housing);
67 Ferrule hole;
68 Push surface;
70 Movable-side arm part (second arm part);
71 Front latch part;
72 Rear latch part;
73 Latch protrusion;
74 Ridden part.

The invention claimed is:

1. An optical connector system comprising:
a first optical connector comprising:
a first ferrule; and
a first housing that houses the first ferrule; and
a second optical connector comprising:
a second ferrule that connects to the first ferrule;
a second inner housing that houses the second ferrule; and
a second outer housing that houses the second inner housing, wherein
the second optical connector detachably connects to the first optical connector, wherein
the first housing comprises a latch receptacle and a latch releaser,
the second inner housing comprises:
a front latch that latches to the latch receptacle; and
a rear latch that latches to the second outer housing,
the rear latch latches to the second outer housing before the first optical connector connects to the second optical connector,
after the front latch latches to the latch receptacle, the latch releaser releases the rear latch by relatively moving the first optical connector and the second optical connector to a connection side,
the second outer housing comprises a latch protrusion that latches to the rear latch, and
after the latch of the latch protrusion and the rear latch is released, the latch receptacle is sandwiched between the latch protrusion and the front latch.

2. The optical connector system according to claim 1, wherein,
when the front latch latches to the latch receptacle, the first housing and the second inner housing have a predetermined positional relationship, and
when the rear latch is released, the second inner housing is movable with respect to the second outer housing.

3. The optical connector system according to claim 1, wherein
the first housing further comprises a first arm,
the latch receptacle and the latch releaser are disposed on the first arm that extends toward the second optical connector along a connection direction of the first optical connector and the second optical connector, and
an escape part is disposed on the first arm and passes through the latch protrusion after the rear latch has been released.

4. The optical connector system according to claim 3, wherein the escape part has a groove shape along the connection direction of the first optical connector and the second optical connector.

5. The optical connector system according to claim 1, wherein
the first housing further comprises a first arm that extends toward the second optical connector along a connection direction of the first optical connector and the second optical connector,
the second inner housing further comprises a second arm that extends toward the first optical connector along the connection direction of the first optical connector and the second optical connector,
the latch receptacle and the latch releaser are disposed on the first arm, and
the rear latch is disposed on the second arm.

6. The optical connector system according to claim 5, wherein the latch releaser is adjacent to the latch receptacle and closer to the second optical connector than the latch receptacle.

7. The optical connector system according to claim 5, wherein the front latch is closer to the first optical connector than the rear latch.

8. An optical connector system comprising:
a first optical connector comprising:
   a first ferrule; and
   a first housing that houses the first ferrule; and
a second optical connector comprising:
   a second ferrule that connects to the first ferrule;
   a second inner housing that houses the second ferrule; and
   a second outer housing that houses the second inner housing, wherein
   the second optical connector detachably connects to the first optical connector, wherein
the first housing comprises a latch receptacle and a latch releaser,
the second inner housing comprises:
   a front latch that latches to the latch receptacle; and
   a rear latch that latches to the second outer housing,
the rear latch latches to the second outer housing before the first optical connector connects to the second optical connector,
after the front latch latches to the latch receptacle, the latch releaser releases the rear latch by relatively moving the first optical connector and the second optical connector to a connection side,
the first housing further comprises a first arm that extends toward the second optical connector along a connection direction of the first optical connector and the second optical connector,
the second inner housing further comprises a second arm that extends toward the first optical connector along the connection direction of the first optical connector and the second optical connector,
the latch receptacle and the latch releaser are disposed on the first arm, and
the rear latch is disposed on the second arm.

9. The optical connector system according to claim 8, wherein,
   when the front latch latches to the latch receptacle, the first housing and the second inner housing have a predetermined positional relationship, and
   when the rear latch is released, the second inner housing is movable with respect to the second outer housing.

10. The optical connector system according to claim 8, wherein
   the second outer housing comprises a latch protrusion that latches to the rear latch,
   after the latch of the latch protrusion and the rear latch is released, the latch receptacle is sandwiched between the latch protrusion and the front latch,
   the first housing further comprises a first arm,
   the latch receptacle and the latch releaser are disposed on the first arm that extends toward the second optical connector along a connection direction of the first optical connector and the second optical connector, and
   an escape part is disposed on the first arm and passes through the latch protrusion after the rear latch has been released.

11. The optical connector system according to claim 10, wherein the escape part has a groove shape along the connection direction of the first optical connector and the second optical connector.

12. The optical connector system according to claim 8, wherein the latch releaser is adjacent to the latch receptacle and closer to the second optical connector than the latch receptacle.

13. The optical connector system according to claim 8, wherein the front latch is closer to the first optical connector than the rear latch.

* * * * *